United States Patent [19]

Asai et al.

[11] Patent Number: 5,116,644
[45] Date of Patent: May 26, 1992

[54] PLASTIC LENS AND METHOD OF FORMING ANTI-REFLECTING LAYER ON A PLASTIC LENS

[75] Inventors: Kazuo Asai; Masaharu Kikuchi, both of Tokyo, Japan

[73] Assignee: Asahi Kogaku Kogyo Kabushiki Kaisha, Tokyo, Japan

[21] Appl. No.: 690,325

[22] Filed: Apr. 26, 1991

Related U.S. Application Data

[63] Continuation of Ser. No. 363,682, Jun. 9, 1989, abandoned.

[30] Foreign Application Priority Data

Jun. 10, 1988 [JP] Japan ................................ 63-143128

[51] Int. Cl.$^5$ .............................................. B05D 5/06
[52] U.S. Cl. .................................... 427/164; 427/273; 427/274; 427/336; 427/352
[58] Field of Search ................ 427/164, 273, 274, 352, 427/336

[56] References Cited

U.S. PATENT DOCUMENTS 4,374,158  2/1983  Taniguchi et al. ............... 427/165

FOREIGN PATENT DOCUMENTS 57-047330  3/1982  Japan .

*Primary Examiner*—Janyce Bell
*Attorney, Agent, or Firm*—Sandler, Greenblum & Bernstein

[57] ABSTRACT

A plastic lens having an anti-reflecting and hard coat layer is provided. The anti-reflecting layer is formed by coating a lens with a hard coat solution containing at least one oxide sol, hardening the coated solution to give a hard coat layer and immersing the lens into an acidic or alkaline solution to dissolve the oxide particles contained in the hard coat layer so as to make the layer non-uniform.

The anti-reflecting effect of the formed layer is equivalent to that of a conventional anti-reflecting film consisting of at least three layers.

8 Claims, No Drawings

PLASTIC LENS AND METHOD OF FORMING ANTI-REFLECTING LAYER ON A PLASTIC LENS

This application is a continuation of application Ser. No. 07/363,682, filed Jun. 9, 1989, now abandoned.

BACKGROUND OF THE INVENTION

1. Field of the Invention

The present invention relates to a plastic lens having an anti-reflecting and hard coat layer and to a method of forming an anti-reflecting layer on a plastic lens.

2. Description of the Prior Art

A plastic lens is provided with a hard coat on the surface of the lens to improve its anti-abrasive property and, is provided on the hard coat, with an anti-reflecting film to both prevent reflection on the surface of the lens and increase the light transmittance.

It is well known that the anti-reflecting film may comprise single or plural layers. An anti-reflecting film consisting of at least three layers having different indices of refraction, is usually preferred, because an anti-reflecting film consisting of one or two layers can still have a high reflectance as well as a low efficiency of preventing reflection.

Known methods of forming an anti-reflecting film include vacuum deposition, dip coating, spin coating, and the like. However, these methods are complicated and low in productivity.

SUMMARY OF THE INVENTION

An object of the invention is to eliminate the above-mentioned disadvantages of the prior art and to provide a plastic lens having an anti-reflecting and hard coat layer.

Another object of the invention is to provide a method of forming an anti-reflecting layer having high light transmission on the surface of a plastic lens.

Another object of the invention is to provide a method of forming an anti-reflecting layer having high light transmission that is both simple in operation and has high productivity.

These and other objects will be clarified in the following description of the present invention.

According to the present invention, there is provided a plastic lens having an anti-reflecting and hard coat layer, in which oxide particles are contained in a concentration varied in the direction of the thickness of the layer and increasing in the direction of the lens.

According to the present invention, there is also provided a method of forming an anti-reflecting layer on a plastic lens which comprises the steps of:

coating the lens with a hard coat solution containing at least one silane coupling agent, at least one oxide sol and at least one epoxy resin in a solvent, hardening the coated solution to give a hard coat layer on the surface of the lens, and immersing the lens into an aqueous solution of an acidic or alkaline substance to selectively dissolve the oxide sol contained in the hard coat layer so as to make the layer ununiform.

The method of the present invention is applicable to various plastic lens. As a plastic for lenses, there may be mentioned, for example, acrylic resin, polycarbonates, diethylene glycol bis(allyl carbonate) polymer, diacrylate or dimethacrylate polymer and copolymer of (halogenated) bisphenol A, urethane-modified acrylate or methacrylate polymer and copolymer of (halogenated) bisphenol A, polyurethane resin such as urethane resin consisting of a diisocyanate and a polyol mercaptoalkyl ester.

DETAILED DESCRIPTION OF EMBODIMENTS

Various silane coupling agents can be used in the present invention without any limitation. The silane coupling agents which can be used include, for example, a compound represented by the following general formula:

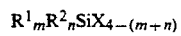

wherein $R^1$ is an alkyl group, an alkenyl group, a phenyl group or a halogen atom, $R^2$ is an organic group having epoxy, glycidoxy, amino, amide, mercapto, methacryloyloxy, cyano and/or aromatic nucleus having at least one substituent on the nucleus, X is a hydrolyzable group such as halogen, an alkoxy group, an alkoxyalkoxy group or an acyloxy group, each of m and n is a value of 0 to 2, and $m+n \leq 3$, and a hydrolysate or partial condensation product thereof. Exemplary silane coupling agents represented by the above formula include tetrafunctional silanes such as tetramethoxysilane, trifunctional silanes such as methyltrimethoxysilane, methyltriethoxysilane, γ-chloropropyltrimethoxysilane, vinyltrimethoxysilane, γ-methacryloyloxypropyltrimethoxysilane, β-(3, 4-epoxycyclohexyl) ethyltrimethoxysilane, γ-glycidoxypropyltrimethoxysilane, γ-mercaptopropyltrimethoxysilane, γ-aminopropyltrimethoxysilane, N-β-(aminoethyl-γ-aminopropyltrimethoxysilane, γ-ureidopropyltrimethoxysilane, γ-cyanopropyltrimethoxysilane, γ-morpholinopropyltrimethoxysilane, N-phenylaminopropyltrimethoxysilane, bifunctional silanes in which the said trifunctional silanes are partially substituted by an alkyl group, a phenyl group and/or a vinyl group etc. such as dimethyldimethoxysilane, vinylmethyldimethoxysilane, phenylmethyldimethoxysilane, γ-chloropropylmethyldimethoxysilane, γ-glycidoxypropyl-methyldiethoxysilane and the like. The hydrolysates or partial condensation products of the compounds mentioned above can be also employed. The silane coupling agent is used in a concentration of 1~40% by weight, preferably of 3~20% by weight in the hard coat solution.

In the present invention, various oxide sols can be used for adjusting a refractive index of the anti-reflecting layer. Useful oxide sols include colloidal silica, colloidal antimony oxide, colloidal titanium oxide and the like. The colloidal silica, colloidal antimony oxide or colloidal titanium oxide is a colloidal solution in which ultrafine particles of silicic anhydride, antimony pentoxide or titanium dioxide, respectively, are dispersed in water or in an alcoholic dispersion medium and is available in the market. Alcohols which can be used as a dispersion medium for the oxide include methanol, ethanol, isopropyl alcohol and the like. The used amount of the colloidal silica, colloidal antimony oxide and/or colloidal titanium oxide can be determined according to the refractive index to be adjusted and is usually 10~80% by weight and preferably 10~50% by weight in the hard coat solution.

In the present invention, useful epoxy resins include various epoxy resins of bisphenol A, bisphenol F, bisphenol S, hydrogenated bisphenol A, bisphenol A-alkylene oxide adducts, phenolic novolak or o-cresol novolak type. Exemplary epoxy resins include polymerizates of glycidyl ester ether of p-hydroxybenzoic acid, diglycidyl ester of dimer acid, diglycidyl o-phthalate, diglycidyl terephthalate, diglycidyl hexahydrophthalate, diglycidyl methyltetrahydrophthalate, 1, 6-hexanediol diglycidyl ether, neopentyl glycol diglycidyl ether, trimethylolpropane triglycidyl ether, ethylene glycol diglycidyl ether, polyethylene glycol diglycidyl ether, propylene glycol diglycidyl ether, polypropylene glycol diglycidyl ether, dibromoneopentyl glycol diglycidyl ether, glycerol polyglycidyl ether, trimethylolpropane polyglycidylether, diglycerol polyglycidyl ether, polyglycerol polyglycidyl ether, sorbitol polyglycidyl ether, allyl glycidyl ether, 2-ethylhexyl glycidyl ether, phenyl glycidyl ether, phenyl- $(EO)_5$ glycidyl ether, p-tert-butyl-phenyl glycidyl ether, dibromophenyl glycidyl ether, lauryl alcohol-$(EO)_{15}$ glycidyl ether and the like. Among these epoxy resins, one or more than one epoxy resin can be used.

The epoxy resin is used in a concentration of 1~20% by weight, preferably 5~10% by weight in the hard coat solution.

To harden the silane coupling agent and the epoxy resin, a hardening catalyst can be added to the hard coat solution. As the hardening catalyst, there may be mentioned organic amines such as triethylamine, n-butylamine etc. amino acids such as glycine, etc.; metal acetylacetonates such as aluminum acetylacetonate, chromium acetylacetonate, titanium acetylacetonate, cobalt acetylacetonate, etc.; metal salts of organic acids such as sodium acetate, zinc naphthenate, cobalt naphthenate, zinc caprylate, tin caprylate, etc.; and Lewis acids such as stannic chloride, aluminum chloride, ferric chloride, titanium chloride, zinc chloride, antimony chloride, etc. Among these catalysts, aluminum acetylacetonate is preferred.

Based upon workability of the coating, preferably the above-described components are dissolved in a suitable solvent to obtain a hard coat solution. Useful solvents include lower alcohols such as methanol, ethanol, propanol, butanol, etc.; lower carboxylic acids or alkyl esters thereof, such as acetic acid, methyl acetate; ethers such as Cellosolve, etc.; ketones such as acetone, etc. Usually, a solution of solid content of 1~40% by weight in said solvent is preferably used. The solid content in the hard coat solution is not limited to the above range, but will be suitably selected depending upon other conditions.

To improve the flowability of the hard coat solution during coating and the evenness of the coated layer, various surfactants of the silicone type, the fluorine type, or the like can be added to the hard coat solution. Especially, a silicone surfactant is preferably used.

In addition, UV absorbing agents, anti-oxidants, thixotropic agents, pigments, dyes, antistatic agents and conductive particles, etc. can be added to the hard coat solution.

The hard coat layer is formed by coating a plastic lens with a hard coat solution containing the above-described components according to a conventional method and hardening the coated solution. Coating can be carried out, for example, by flow coating, dip coating, spin coating, roll coating, spray coating, and the like. Drying and hardening can preferably be carried out by heating the coated solution at a temperature of 80°~130° C. for 30 minutes to 8 hours, depending upon the used components.

Hardening can be carried out by irradiating the coated lens with infrared, ultraviolet, gamma or electron radiation, so as to promote crosslinkage or polymerization reaction of the reactive radical of the used components.

The thickness of the coated layer can be adjusted by selection of a solvent or a coating method and is usually 2~10 μm, and preferably 2~4 μm.

In the practice of the present invention, the lens having the hard coat layer formed thereon in the manner described above is then immersed into an aqueous solution of an acidic or alkaline substance. Any acidic or alkaline substance can be employed, so far as it can dissolve the oxide particles contained in the hard coat layer without affecting the other components. As the acidic substance, there may be mentioned, for example, hydrochloric acid, sulfuric acid, hydrofluoric acid, ammonium fluoride, tartaric acid and the like. As the alkaline substance, there may be mentioned, for example, potassium pyrophosphate, sodium hydroxide, potassium hydroxide and the like. The acidic or alkaline substance can be used alone or in a mixture. The concentration of the aqueous solution of the acidic or alkaline substance and the immersion time of the lens into the solution depends upon desired refractive index of the anti-reflecting layer. The acidic or alkaline solution is used usually in a concentration of 3~20% by weight, preferably 5~10% by weight. When the concentration of the acidic or alkaline solution is less than 3% by weight, oxide particles can not be dissolved enough to attain sufficient anti-reflecting effect. When the concentration of the acidic or alkaline solution is more than 20% by weight, the hard coat layer will be undesirably removed. The immersion into the acidic or alkaline solution is carried out for 5~60 minutes, preferably 10~30 minutes. If immersion time is too short, the effect of immersion cannot be obtained. Conversely, if the immersion time is too long, the hard coat layer may be dissolved.

When the lens having the hard coat layer is immersed into an aqueous solution of an acidic or alkaline substance in such a manner as described above, only oxide particles contained in the hard coat layer are dissolved, so that the hard coat layer is made non-uniform. In this connection, an amount of the acidic or alkaline substance permeated into the hard coat layer becomes lower with depth from the surface of the layer and the extent of ununiformness also varies with depth from the surface of the layer, so that a layer, in which refractive index varies in the direction of the thickness of the layer, can be formed. In other words, the oxide particles are distributed in the layer in a concentration that substantially progressively increases with depth.

After removing from the aqueous solution of the acidic or alkaline substance, the lens is washed thoroughly with pure water or warm water.

Thus, a lens having an anti-reflecting and hard coat layer can be obtained.

As described above, a hard coat layer, which also has anti-reflecting effect, can be easily formed on various plastic lenses according to the present invention. Namely, various plastic lenses having an anti-reflecting layer and a hard coat layer can be easily produced according to the present invention by employing a very simple operation which has high productivity. Further, the anti-reflecting effect of the layer formed by the method of the present invention is equivalent to that of a conventional anti-reflecting film consisting of three layers.

The present invention will be further described with reference to examples. However, it should be understood that the present invention is not limited to these examples, and many variations and modifications may be made within the spirit and scope of the invention. In the following examples, "part" and "%" mean "part by weight" and "% by weight", respectively. Furthermore, all sols are used as a dispersion of 30% by weight of each oxide in a solvent.

EXAMPLE 1

A mixture of 50 parts of γ-glycidoxypropyltrimethoxy-silane and 50 parts of γ-glycidoxypropyltriethoxysilane, as silane coupling agents, was hydrolyzed with 25 parts of 0.1N hydrochloric acid and stirred at 20° C. for 24 hours. The so obtained hydrolysate was thoroughly mixed with 240 parts of silica sol dispersed in methanol (NISSAN CHEMICALS, Co. Ltd.) and 60 parts of antimony oxide sol dispersed in methanol (NISSAN CHEMICALS, Co. Ltd.) as oxide sols, 10 parts of propylene glycol diglycidyl ether as an epoxy resin, 0.5 part of aluminum acetylacetonate as a hardening agent, 0.1 part of ZONYL FSN as a surfactant, and 150 parts of methanol as a solvent to prepare a hard coat solution yielding a hard coat layer of a refractive index of 1.50.

A plastic lens (refractive index=1.50) made from diethylene glycol bis(allyl carbonate) polymer was coated with the above obtained hard coat solution so as to form the hard coat layer having a dried thickness of 3 μm on the surface of a lens, and then heated at 120° C. for 4 hours to harden the coated solution.

The thus obtained lens having the hard coat layer was immersed into an 5% solution of a mixture of ammonium fluoride and hydrochloric acid for 15 minutes. Thereafter, the lens was thoroughly washed with water.

The obained lens showed a total light transmittance of 98%.

EXAMPLE 2

A mixture of 20 parts of β-(3, 4-epoxycyclohexyl) ethyltrimethoxysilane, 60 parts of γ-glycidoxypropyltrimethoxysilane and 20 parts of γ-glycidoxypropylmethyldiethoxysilane as silane coupling agents was hydrolyzed with 25 parts of 0.1N hydrochloric acid and stirred at 20° C. for 24 hours. The obtained hydrolysate was thoroughly mixed with 300 parts of antimony oxide sol dispersed in methanol (NISSAN CHEMICALS, Co. Ltd.) and 150 parts titanium oxide sol dispersed in methanol(SHOKUBAI CHEMICALS Co. Ltd.) as oxide sols, 15 parts of diglycidyl ester of methyltetrahydrophthalate as an epoxy resin, 0.5 part of aluminum acetylacetonate as a hardening agent, 0.1 part of ZONYL FSN as a surfactant and 120 parts of methanol as a solvent to prepare a hard coat solution yielding a hard coat layer of a refractive index of 1.60.

A plastic lens (refractive index=1.60) made from m-xylylene diisocyanate and pentaerythritol tetrakis(3-mercapto-propionate) of a ratio by weight of 1:1.3) was coated with the above obtained hard coat solution so as to form a hard coat layer of dryed thickness of 4 μm on the surface of the lens and then, heated at 130° C. for 5 hours to harden the coated solution.

The thus obtained lens having the hard coat layer was immersed into an 10% solution of a mixture of hydrofluoric acid and hydrochloric acid (1:1) for 20 minutes. Thereafter, the lens was thoroughly washed with water.

The obained lens showed a total light transmittance of 98%.

What is claimed is:

1. A method of forming an anti-reflecting layer on a plastic lens which comprises:

coating the lens with a solution containing at least one silane coupling agent, at least one colloidal oxide sol and at least one epoxy resin in a solvent, hardening the coated solution to give a hard coat layer on the surface of the lens, said hard coat layer containing oxide particles, and immersing the lens into an aqueous solution of an acidic or alkaline substance to dissolve the oxide particles contained in the layer so that the refractive index in the direction of the thickness of the layer varies.

2. A method as claimed in claim 1, wherein said silane coupling agent is selected from the group consisting of (a) a compound represented by the following general formula:

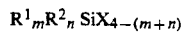

$$R^1{}_m R^2{}_n SiX_{4-(m+n)}$$

wherein $R^1$ is an alkyl group, an alkenyl group, a phenyl group or a halogen atom, $R^2$ is an organic group having at least one constituent selected from the group consisting of epoxy, glycidoxy, amino, amide, mercapto, methacryloyloxy, cyano and aromatic group having at least one substituent, X is a hydrolyzable group selected from the group consisting of a halogen, an alkoxy group, an alkoxyalkoxy group and an acyloxy group, each of m and n is a value of from 0 to 2, and $m+n \leq 3$, and (b) hydrolysates or partial condensation products thereof.

3. A method as claimed in claim 1, wherein said silane coupling agent is used in an amount of from about 1 to about 40% by weight based on the total weight of said solution.

4. A method as claimed in claim 1, wherein said oxide sol comprises colloidal silica, colloidal antimony oxide or colloidal titanium oxide or a mixture thereof.

5. A method as claimed in claim 1, wherein said oxide sol is used in an amount of from about 10 to about 80% by weight based on the total weight of said solution.

6. A method as claimed in claim 1, wherein said epoxy resin comprises an epoxy resin of bisphenol A, bisphenol F, bisphenol S, hydrogenated bisphenol A, bisphenol A-alkylene oxide adducts, phenolic novolak or o-cresol novolak type.

7. A method as claimed in claim 1, wherein said epoxy resin is used in an amount of from about 1 to about 20% by weight based on the total weight of said solution.

8. A method as claimed in claim 1, wherein said aqueous solution of an acidic or alkaline substance contains, as an acidic substance, hydrochloric acid, sulfuric acid, hydrofluoric acid, ammonium fluoride, or tartaric acid, or, as an alkaline substance, potassium pyrophosphate, sodium hydroxide, or potassium hydroxide.

* * * * *